US011222129B2

(12) United States Patent
Linton et al.

(10) Patent No.: US 11,222,129 B2
(45) Date of Patent: Jan. 11, 2022

(54) ENTITY RESOLUTION BETWEEN MULTIPLE PRIVATE DATA SOURCES

(71) Applicant: International Business Machines Corporation, Armonk, NY (US)

(72) Inventors: Jeb R. Linton, Manassas, VA (US); Dennis Kramer, Siler City, NC (US); Michael Amisano, East Northport, NY (US); John Melchionne, Kingston, NY (US)

(73) Assignee: International Business Machines Corporation, Armonk, NY (US)

( * ) Notice: Subject to any disclaimer, the term of this patent is extended or adjusted under 35 U.S.C. 154(b) by 274 days.

(21) Appl. No.: 16/449,666

(22) Filed: Jun. 24, 2019

(65) Prior Publication Data

US 2020/0401715 A1 Dec. 24, 2020

(51) Int. Cl.
*G06F 21/62* (2013.01)
*G06F 16/2457* (2019.01)
*G06F 16/28* (2019.01)

(52) U.S. Cl.
CPC ...... *G06F 21/6218* (2013.01); *G06F 16/2457* (2019.01); *G06F 16/288* (2019.01)

(58) Field of Classification Search
CPC ............ G06F 21/6218; G06F 16/2457; G06F 16/288; G06F 40/295
See application file for complete search history.

(56) References Cited

U.S. PATENT DOCUMENTS

| 6,421,650 B1 | 7/2002 | Goetz et al. |
| 7,181,017 B1 * | 2/2007 | Nagel ................... H04L 9/0825 |
| | | 380/282 |
| 7,900,052 B2 * | 3/2011 | Jonas .................. G06F 21/6218 |
| | | 713/179 |
| 9,031,853 B2 | 5/2015 | Bartfeld et al. |

(Continued)

FOREIGN PATENT DOCUMENTS

CN 105303113 B 8/2018

OTHER PUBLICATIONS

Kumar et al., "A critical review on application of secure multi party computation protocols in cloud environment," International Journal of Engineering & Technology, 7 (2.7), 2018, pp. 363-366. (Year: 2018).*

(Continued)

*Primary Examiner* — Phuong Thao Cao
(74) *Attorney, Agent, or Firm* — Nolan M. Lawrence (57) ABSTRACT

A first request to perform an entity resolution operation is received from a first client. The first request is related to a first record uploaded by the first client. The first record has one or more first attributes. The first record is stored in a secure data store. The first request is transmitted to a first program split of a secure multi-party computation. An entity resolution operation is performed by the first program split of the secure multi-party computation and by a third program split of the secure multi-party computation. The entity resolution operation is performed based on the received request. The entity resolution operation is related to the first record and one or more second records uploaded to the secure data store by a second client. The third program split of the secure multi-party computation operates in the secure data store.

19 Claims, 5 Drawing Sheets

(56) References Cited

U.S. PATENT DOCUMENTS

| | | | |
|---|---|---|---|
| 9,177,265 B2 | 11/2015 | Bartfeld et al. | |
| 9,197,637 B2 | 11/2015 | Sy et al. | |
| 9,419,951 B1 | 8/2016 | Felsher et al. | |
| 9,648,021 B2 | 5/2017 | Tsai | |
| 9,729,525 B1 | 8/2017 | Kolman et al. | |
| 9,996,607 B2* | 6/2018 | Alexe | G06F 16/215 |
| 10,127,289 B2* | 11/2018 | Manning | G06F 16/35 |
| 10,515,625 B1* | 12/2019 | Metallinou | G10L 15/26 |
| 10,614,242 B2* | 4/2020 | Rogers | G06F 21/6245 |
| 10,628,483 B1* | 4/2020 | Rao | G06F 16/3334 |
| 10,691,825 B2* | 6/2020 | Jones | G06F 21/60 |
| 2004/0210763 A1 | 10/2004 | Jonas | H04L 63/0407 |
| | | | 713/193 |
| 2009/0282039 A1* | 11/2009 | Diamond | G06F 16/90344 |
| 2015/0220588 A1* | 8/2015 | Krauss | G06F 16/245 |
| | | | 707/692 |
| 2016/0012195 A1 | 1/2016 | Lee | |
| 2016/0078446 A1* | 3/2016 | Trostle | H04L 63/145 |
| | | | 705/75 |
| 2016/0085938 A1 | 3/2016 | Hans | |
| 2016/0125067 A1* | 5/2016 | Alexe | G06F 16/288 |
| | | | 707/603 |
| 2016/0205114 A1* | 7/2016 | Yan | H04L 63/08 |
| | | | 713/168 |
| 2017/0364595 A1 | 12/2017 | Desai et al. | |
| 2018/0096166 A1* | 4/2018 | Rogers | H04W 12/02 |
| 2018/0139045 A1* | 5/2018 | Furukawa | H04L 63/06 |
| 2018/0276417 A1* | 9/2018 | Cerezo Sanchez | G06F 21/74 |
| 2018/0357434 A1* | 12/2018 | Roy | H04L 9/0643 |
| 2018/0367293 A1 | 12/2018 | Chen et al. | |
| 2019/0245705 A1* | 8/2019 | Kumar | H04L 67/12 |
| 2019/0286837 A1* | 9/2019 | Yim | H04L 9/0891 |
| 2019/0303371 A1* | 10/2019 | Rowe | G06F 16/24564 |
| 2019/0378599 A1 | 12/2019 | Amisano et al. | |
| 2020/0184100 A1* | 6/2020 | Ong | G06F 9/44505 |
| 2020/0211105 A1* | 7/2020 | Du | G06Q 40/025 |
| 2020/0226284 A1* | 7/2020 | Yin | G06F 21/6254 |
| 2021/0051007 A1* | 2/2021 | Li | H04L 9/0869 |
| 2021/0051008 A1* | 2/2021 | Li | H04L 9/0819 |

OTHER PUBLICATIONS

Pal et al., "Designing an Algorithm to Preserve Privacy for Medical Record Linkage with Error-Prone Data," JMIR Medical Informatics 2014, vol. 2, Issue 1, 18 pages. (Year: 2014).*

Valsalan et al., "Multi-Party Privacy-Preserving Record Linkage using Bloom Filters," arXiv:1612.08835v1 [cs.DB], Dec. 28, 2016, 13 pages. (Year: 2016).*

Jahan et al., "Design of a Secure Sum Protocol using Trusted Third Party System for Secure Multi-Party Computations", 2015 6th International Conference on Information and Communication Systems (ICICS), Apr. 7-9, 2015, IEEE, pp. 136-141. (Year: 2015).*

Vatsalan et al., "A Taxonomy of Privacy-Preserving Record Linkage Techniques", Information Systems 38 (2013): pp. 946-969. (Year: 2013).*

Singha et al., "A Review on Security and Privacy Challenges of Big Data", Cognitive Computing for Big Data Systems Over IoT, First Online: Dec. 31, 2017, 11 pages.

Vatsalan et al., "A taxonomy of privacy-preserving record linkage techniques", Information Systems, SciVerse ScienceDirect, Nov. 2012, 24 pages.

Du et al., "Secure Multi-Party Computation Problems and Their Applications: A Review and Open Problems", In Proceedings of the 2001 Workshop on New Security Paradigms, ACM, Sep. 2001, 10 pages.

Mell et al., "The NIST Definition of Cloud Computing", Recommendations of the National Institute of Standards and Technology, Special Publication 800-145, Sep. 2011, 7 pages.

Kramer et al., "Secure Data Monitoring Utilizng Secure Private Set Intersection", U.S. Appl. No. 16/203,830, filed Nov. 29, 2018.

Anonymous, "Securing Supply Chain Interactions in Regulatory Domain Translation<br /><br />," IP.com Prior Art Database Technical Disclosure, IP.com No. IPCOM000255461D, Sep. 27, 2018, 6 pages. https://ip.com/IPCOM/000255461.

Anonymous, "Method and System for Offering Alternative Drugs to limit Over Prescribing of Antibiotics Using Cognitive Techniques," IP.com Prior Art Database Technical Disclosure, IP.com No. IPCOM000250710D, Aug. 25, 2017, 5 pages. https://ip.com/IPCOM/000250710.

Anonymous, "Blockchain/Cognitive Technology Platform as an Adviser to Support Pharmacy Operations: Drug Use Management and Drug Inventory Management," IP.com Prior Art Database Technical Disclosure, IP.com No. IPCOM000249234D, Feb. 10, 2017, 5 pages. https://ip.com/IPCOM/000249234.

Hammer, T., "eMedication—improving medication management using information technology," Linnaeus University Dissertations, Doctoral Disseration, No. 188/2014, Oct. 2014, 77 pages.

Kirking et al., "Detecting and Preventing Adverse Drug Interactions: The Potential Contribution of Computers in Pharmacies," Soc. Sci. Med., vol. 22, No. 1, pp. 1-8, 1986, Pergamon Press Ltd.

Wang et al., "SCORAM: Oblivious RAM for Secure Computation," CCS '14: Proceedings of the 2014 ACM SIGSAC Conference on Computer and Communications Security, Nov. 2014, 12 pages.

Melchionne et al., "Medical Intervention Based on Separate Data Sets," U.S. Appl. No. 16/792,708, filed Feb. 17, 2020.

List of IBM Patents or Patent Applications Treated as Related, Signed Feb. 17, 2020, 2 pages.

\* cited by examiner

ENTITY RESOLUTION BETWEEN MULTIPLE PRIVATE DATA SOURCES

BACKGROUND

The present disclosure relates to data comparison and searching, and more specifically, to secure multi-party computation entity resolution.

Data security is a field of securing information from any unauthorized parties. Data security may operate in a professional setting to protect proprietary business information. Data security may operate in a medical setting to provide patients with control of their electronic medical records. Data security may operate in a governmental setting where private sector parties are required by law to protect client information.

SUMMARY

According to embodiments disclosed are a method, system, and computer program product. A first request to perform an entity resolution operation is received from a first client. The first request is related to a first record uploaded by the first client. The first record has one or more first attributes. The first record is stored in a secure data store. The first request is transmitted to a first program split of a secure multi-party computation. An entity resolution operation is performed by the first program split of the secure multi-party computation and by a third program split of the secure multi-party computation. The entity resolution operation is performed based on the received request. The entity resolution operation is related to the first record and one or more second records uploaded to the secure data store by a second client. The third program split of the secure multi-party computation operates in the secure data store.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to data comparison and searching, more particular aspects relate to secure multi-party computation entity resolution. While the present disclosure is not necessarily limited to such applications, various aspects of the disclosure may be appreciated through a discussion of various examples using this context.

With the advent of the Internet and pervasive data gathering, there has also risen a need for analysis and searching. Analysis of data may be in the form of data comparison, where two sets of data are compared, and patterns and relationships are identified within the data. Another form may be in data searching, where a specific piece of information is known and used to look for other pieces of information.

There may be complications in situations where not all of the data is in possession or control of a single party. For example, there may be two separate commercial parties from two different countries that each have some data related to seafaring vessels. Each of the two separate commercial parties may wish to coordinate and use the data held by the other, but international law may place privacy constraints on both data sets. In another example, two branches of government have research data related to, amongst other things, the position, shape, and path of celestial bodies, such as meteors. The two branches may, due to security clearances, be required not to provide full access to view and perform searches on their scientific databases. In a third example, two divisions of a corporation may have records on clients and other individuals for marketing and customer service. Due to a data privacy regulation, the two divisions may be permitted to store, view and analyze the data they have directly collected, but may not be able to directly view or read individual records from other companies, or even other divisions within the same company.

Consequently, a technological solution that enables the analysis and comparison of data held in two or more private data sets may be useful. One possible solution is using a two-party computation of a Private Set Intersection. For example, two investigative agencies may wish to compare lists of individuals, from two data sources that are controlled by the two agencies, respectively. Due to privacy requirements, neither of the investigative agencies may share the list of persons but may be allowed to know when they share a common individual. Private Set Intersection may be helpful but may be limited in scope.

Specifically, Private Set Intersection can only identify an exact match between two data sets. This may be of limited usefulness when dealing with entity data. There are two drawbacks to exact match identification. First, data is not always identical between two different parties. In many cases, data may differ. There are situations where users that are responsible for entering data may misspell attributes or make grammatical mistakes. Sometimes, the names of individuals are spelled in an atypical fashion and the average data entry user may not enter that information properly. Sometimes, different organizations use shorthand or other abbreviations when referring to certain attributes. In some scenarios, data may be purposefully entered improperly, when individuals enter forms with partial truths or omissions. Sometimes, data in two data sets may not match because the technology fails, such as when bit rot or other data corruption occurs in one or more parties' data. Other more benign issues may occur: records that are out of date; records that have simple case, punctuation, or spacing differences. In each of these cases, Private Set Intersection would not identify when two data-sets are matching. This problem may be compounded by the fact that parties may agree to allow direct matching, but for a specific duration of time (or for a given number of searches). Because a search may take many different tries to identify an entity (e.g., trying numerous variations or spellings), no progress in comparisons may occur.

Second, Private Set Intersection cannot deal with more complex relationship detection between records. For example, in an astronomical research setting, there may be two related celestial bodies within a solar system: a planet, and a moon. The two celestial bodies may be dissimilar but also related. A simple matching performed for attributes of a location, path, substance, or other feature on one of the celestial bodies may not identify the other. In a second example, an investigator may be trying to discover the whereabouts of a missing person. Attributes stored about the missing person may include their name, birthday, and previous addresses. Other records may also include information regarding other individuals related to the missing person, such as co-workers, aliases, and family members. However, Private Set Intersection may not be able to detect the relationships between entities in these examples.

A method of searching two datasets that may yield improvements is entity resolution. Entity resolution and relationship detection (entity resolution operations) may be performed by a set of rules (e.g., a predetermined set of rules). The rules may function to determine when entries in two data sets refer to the same individual or refer to two individuals with a relationship. For example, a system using such a search model may decide that J. Smith and John Smith, with the same phone number, are the same person; whereas J. Smith and Alice Smith, with the same street address, are two individuals with a relationship. This functionality may be used in the context of intelligence case analysis, though it has many other uses. The drawback to this system is that—so far—private data may not be used in conjunction with entity resolution operations. Rather, entity resolution operations may require that the data of multiple datasets be digested, analyzed, in some cases reorganized. Further, entity resolution operations may require that evaluations are performed, and rules be validated, against many, or all, other entity records.

Embodiments of the disclosure may provide Entity Resolution/Relationship Detection by placing all of the data from two parties within a secure data store. Further, the secure data store may only be accessed in a coordinated fashion through a secure multi-party computation (SMPC) (alternatively, multi-party computation). The SMPC may operate through two or more SMPC programmatic splits. The Entity Resolution/Relationship Detection system may function as a SMPC using one or more relevant techniques, such as Yao Construct Garbled Circuit pair. In some embodiments, SMPC may leverage the use of one or more of the following techniques: Yao Construct Garbled Circuits, Shamir Secret Sharing, Additive Secret Shares, and/or Partially Homomorphic Encryption. This may allow full featured Entity Resolution and Relationship Detection to be performed through a cooperative computation between two organizations (e.g., through the programmatic splits) without requiring either organization to reveal their input data. The operations of the SMPC may provide a zero knowledge system of performing relationship detection and entity relationship (e.g., revealing only the absolute minimum information needed to perform a task, without leaking any other information). The operations of the SMPC may not be able to be performed without all splits. For example, an SMPC operating with two program splits may include a first split first split and a second split. The first split of the program splits may be unable to perform operations without the second split. Further, the second split of the program splits may be unable to perform operations without the first split. In some embodiments, the output may be revealed at the end of the computation to either or both of the organizations.

In some embodiments, a Three-Party Computation variant of SMPC within secure data store may occur, in which the first and second parties are organizations with an interest in detecting entity overlaps and relationships in their private data. The third party in the secure computation may be a Cloud-based Server which houses the secure data store.

In some embodiments, a Two-Party Computation variant of SMPC within a secure data store may occur. Two parties to the Two-Party Computation variant include two organizations with an interest in detecting entity overlaps and relationships in their private data. One of the two parties may agree also to host the secure data store. Security in embodiments where one party hosts the secure data store is equivalent to other embodiments through the secure data store. Specifically, the party hosting the data stored in the secure data store still cannot meaningfully introspect the data or the data access operations.

In some embodiments, computation of a SMPC may involve having three or more organizations access a common shared system which is housed in a cloud-based server. The data cooperatively stored in the secure data store may be encrypted by way of a split key. The split key may use a technique for allowing a subset of parties to access the secure data store, such as Threshold Secret Sharing. Consequently, as long as a required threshold of participants cooperates to perform multi-party computations, the SMPC can recreate the keys needed to decrypt the data in the secure storage. For example, an SMPC may be created with five splits that are each controlled by five parties, one of which may host private data for the five parties. The split key may require that four of the five parties cooperatively operate to perform entity resolution/relationship detection.

Figure 1:
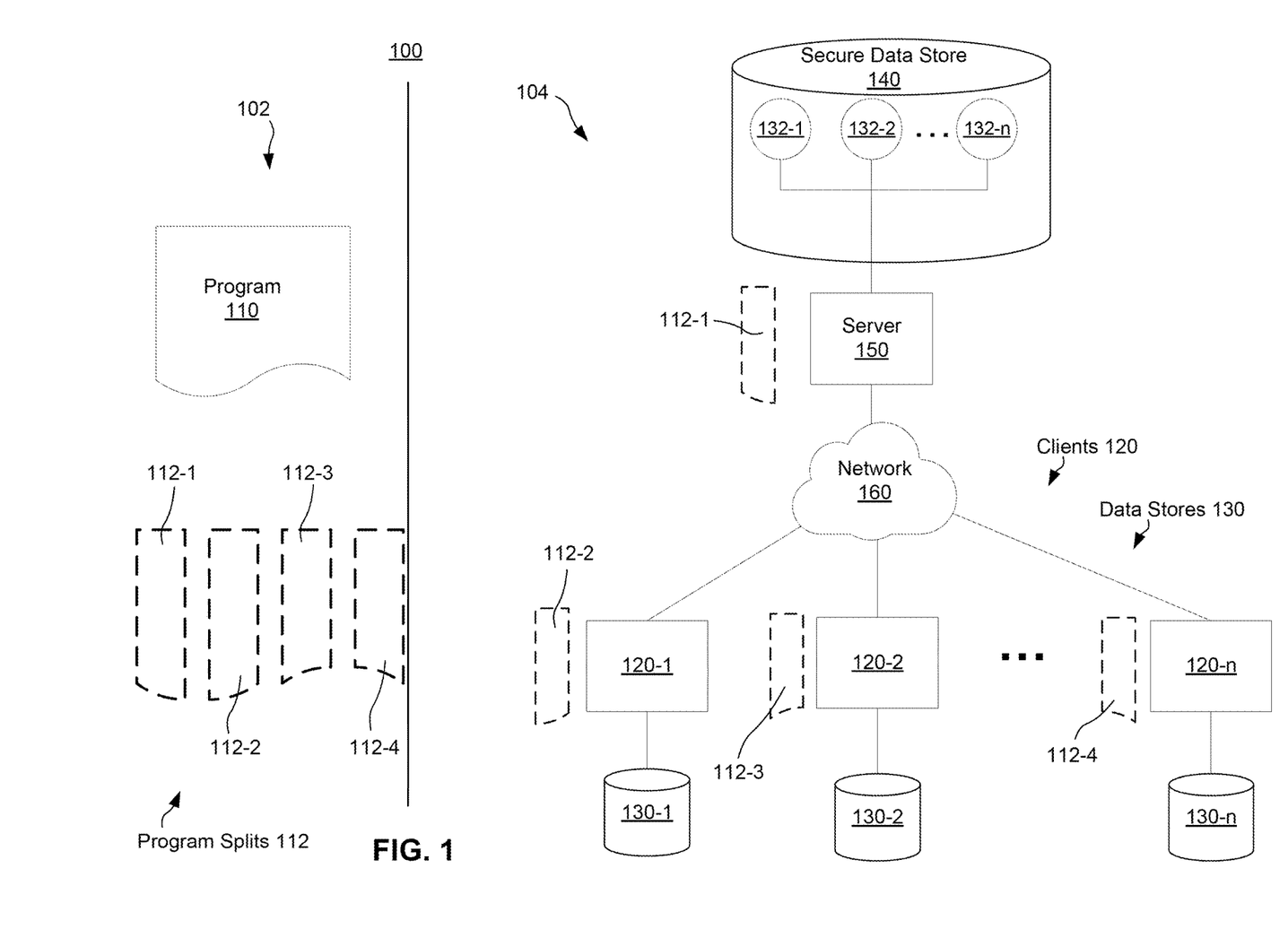
FIG. 1 depicts an example Entity Resolution/Relationship Detection System, consistent with some embodiments of the disclosure.

FIG. 1 depicts an example Entity Resolution/Relationship Detection System (ERDIS) 100, consistent with some embodiments of the disclosure. The ERDIS 100 may permit analysis and enable parties to learn about relationships between records in their own private data sets and the records in other private datasets. The ERDIS 100 may enable entity resolution and relationship detection (entity resolution operations) to be performed without any private data of any party being accessed by any other party.

At a time 102, a program designed to perform one or more operations of system 100 may be compiled into a program 110. During compilation, at 102, the program 110 may be compiled into splits 112-1, 112-2, 112-3, 112-4 (collectively, 112). Each of the splits 112 may be operable by one or more clients or servers of system 100. The number of splits 112 may correspond to the number of clients and servers of a given ERDIS. For example, in an embodiment having seven clients and one server there may be eight splits 112 of program 110. The system 100 may operate at a time 104. Time 104 may be after time 102.

Figure 3:
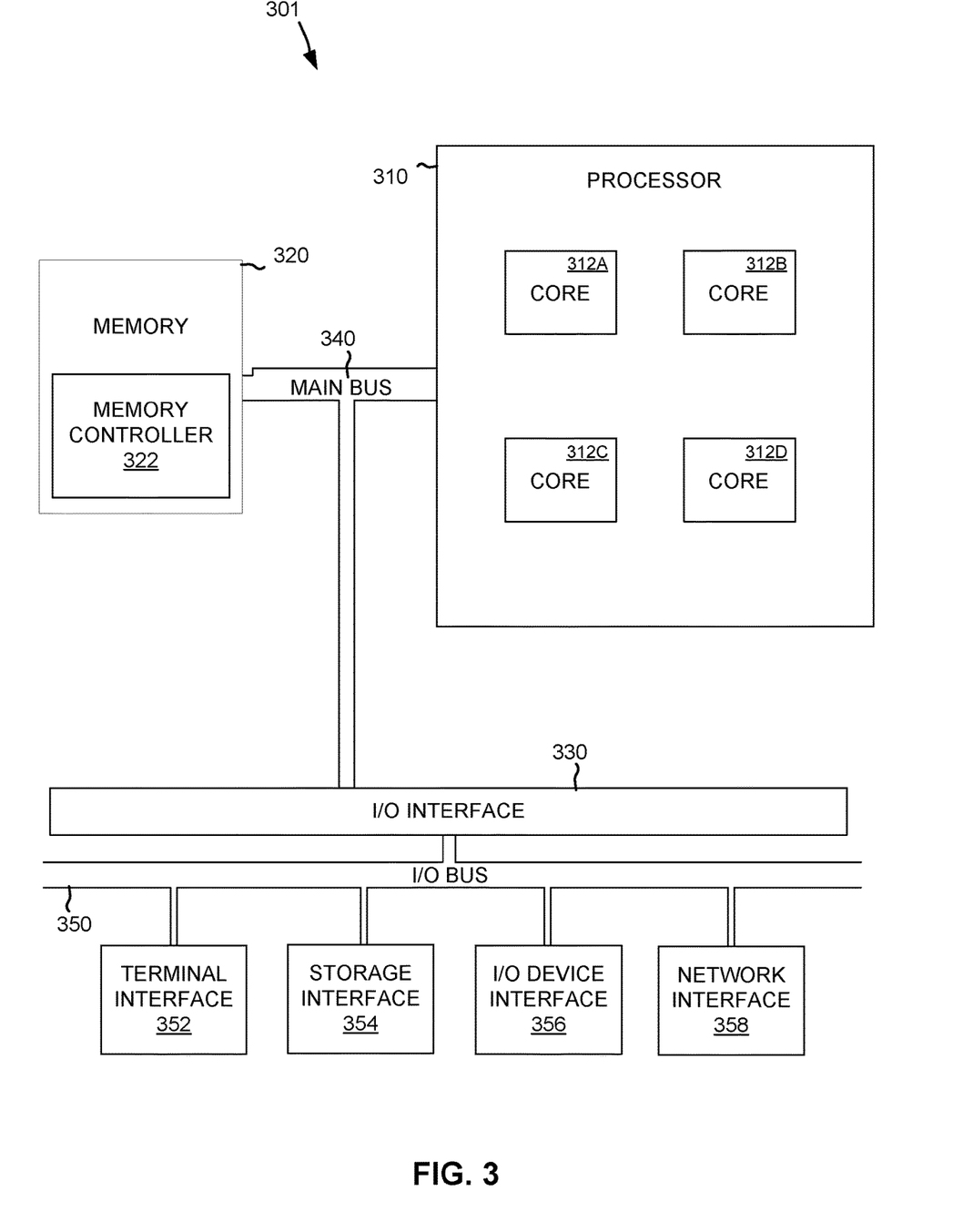
FIG. 3 depicts the representative major components of an example computer system that may be used, in accordance with some embodiments of the present disclosure.

The system 100 may include the following: multiple clients 120-1, 120-2, to 120-*n* (collectively, 120); a secure data store 140; a server 150 for processing of requests to the secure data store; and a network 160 for communicatively connecting the other components of the system. Network 160 may be a network or collection of networks, including a local area network (LAN), or a wide area network, such as, the Internet. The clients 120 may be one or more computer systems or servers (and associated software) configured to receive and process requests, to host users, and to execute a split of program 110 for entity resolution/relationship detection. For example, FIG. 3 depicts an example computer system 301 capable of operating as a client 120 consistent with some embodiments.

Referring back to FIG. 1, the clients 120 may each have a private data store that houses data collected and retained by a party. For example, a first party operates client 120-1 and stores and retrieves data from private data store 130-1. A second party operates client 120-2 and stores and retrieves data from private data store 130-1. Respectively, additional parties operate additional clients and store and retrieve data from other private data stores. For example, an nth party operates client 120-n and stores and retrieves data from private data store 130-n. The private data stores (collectively 130) may be a database, linked list, or other data structure designed to store and retrieve records.

In some embodiments, each client 120 may be under the control of or operate under a single party. For example, a first inspection entity affiliated with a first group may be a first party fully in ownership and control of client 120-1. The first inspection entity may own and control data as part of its normal course of operation to investigate individuals by retaining records in private data store 130-1. A second inspection entity affiliated with a confederation of multiple second groups may be a second party fully in ownership and control of client 120-2. The second inspection entity may own and control data as part of its normal course of operation to investigate individuals by retaining records in private data store 130-2. In such case, clients 120-1 and 120-2 (and private data stores 130-1 and 130-2, respectively) may be located geographically distant from each other.

In some embodiments, multiple parties may be assigned to operate a given client 120. For example, a client 120 may include an authentication and access management system that would enable multiple separate organizations to operate client 120. Enabling multiple separate organizations to operate client 120 may enable multi-tenancy without adding to the computational and architectural complexity of program 110. To provide for multi-tenancy, some embodiments may include distributing the same software to multiple parties and hosting multiple copies of a given client 120 (e.g., through virtual machines). In some embodiments, the distributed software may include time sharing access to a given client 120.

To ensure privacy between multiple parties in embodiments involving sharing a given client 120, data may be labeled and isolated in a given private data store 130. For example, a first party may log into client 120-2 and insert records into private data store 130-2. Upon insertion, client 120-2 may scramble, or otherwise obfuscate the records of the first party before storing those records into private data store 130-2. A second party may also log into client 120-2 (with differing credentials) and insert records into private data store 130-2. Upon insertion, client 120-2 may scramble, or otherwise obfuscate the records of the second party before storing those records into private data store 130-2. All of the records stored in private data store 130-2 may also include a tenant/owner label corresponding to each party. Client 120-2 may operate based on a relevant access control mechanism to only allow the first party and second party access only to their own records and not the records of the other.

Secure data store 140 may be a database, linked list, or other data structure designed to store and retrieve records. In some embodiments, secure data store 140 may operate such that any party cannot discern any meaning regarding the secure data store. For example, client 120-1 may be configured to host secure data store 140. Secure data store 140 may operate such that the insertion, organization, deletion, or other modification of records is oblivious to inspection by client 120-1.

Secured data store 140 may utilize one or more techniques of oblivious storage. Secure data store 140 may operate in the form of Oblivious Random Access Memory (ORAM). ORAM can be thought of as a database that can run on an untrusted server, where the read and write operations are controlled by and visible to a client, but the operations are completely opaque to the server. Secure data store 140 may also operate as a working memory for hosting of one or more programs. In some embodiments, server 150, or one or more splits 112 of program 110 may be executed within secure data store 140. This may ensure that only authenticated clients have access to the operations and functioning of program 110—and the programmatic splits 112 of the program—without any party that hosts secure data store 140 able to discern any meaning of the data and operations within the secure data store.

Figure 5:
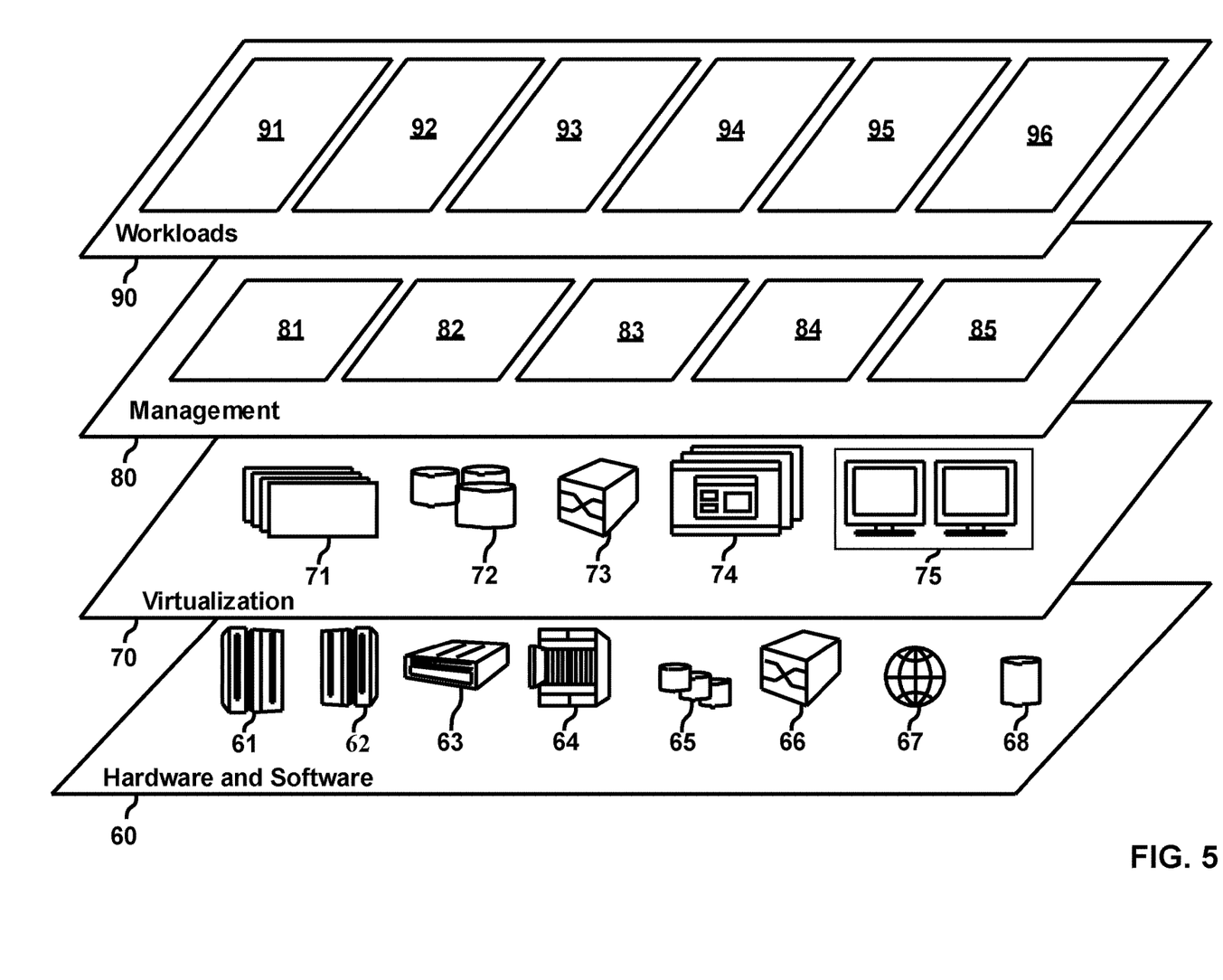
FIG. 5 depicts abstraction model layers according to an embodiment of the present invention.

Server 150 may be a single computer system configured to perform one or more operations of system 100. For example, FIG. 3 depicts a computer system 301 operable as server 150 consistent with some embodiments. Server 150 may be operated as a service including multiple computers either alone or together. Server 150 may enable convenient, on-demand network access to a shared pool of configurable computing resources. For example, FIG. 5 depicts a series of functional abstraction layers provided by a cloud computing environment 50 capable of hosting server 150. Consequently, one or more Entity Resolution/Relationship Determination requests may be handled by one or more layers of a cloud computing environment 50 consistent with some embodiments.

Referring back to FIG. 1, server 150 may operate by handling requests from and providing responses to clients 120 through network 160. Accordingly, server 150 may provide auditing of access by one or more of the clients. For example, server 150 may include a tracking system or ledger of activity recording all data operations of individual clients 120. Server 150 may also record all entity resolution/relationship detection events, for later inspection by one or more of clients 120. Server 150 may also operate by performing data manipulation, insertion, deletion, or otherwise accessing data stored in secure data store 140.

Each client 120 may insert, view, update, or delete records it has stored within the secure data store. For example, client 120-1 may have one or more uploaded records 132-1 in secure data store 140. The uploaded records 132-1 may correspond to a subset of records in private data store 130-1. Client 120-2 may have one or more uploaded records 132-2 in secure data store 140. The uploaded records 132-2 may correspond to a subset of records in private data store 130-2. Correspondingly, client 120-n may have one or more uploaded records 132-n in secure data store 140. The uploaded records 132-n may correspond to a subset of records in private data store 130-1.

In some embodiments, insertion, viewing, updating, or deleting records may only be performed by program 110 through techniques of secure multi-party computation. Server 150 may implement secure multi-party computation to act as a sole or true client permitted to access secure data store 140 in coordination with each respective client. For example, client 120-1 may wish to access one or more records 132-1 in secure data store 140. To perform the access, split 112-2 executed by client 120-1 may operate in concert with split 112-1 executed by server 150 to perform access operations of program 110. No other program splits (e.g., 112-3, 112-4) may operate either alone or in combination to perform access operations on records 132-1; only the combination of split 112-2 and split 112-1. Likewise, records 132-2 may only be accessed by a combination of split 112-3 and split 112-1, and records 132-$n$ may only be accessed by a combination of split 112-4 and split 112-1.

Server 150 may also implement secure multi-party computation to act as a sole or true client to perform entity resolution/relationship detection, consistent with some embodiments. For example, server 150 may be embodied in the form of a garbled circuit that permits full featured entity resolution and relationship detection to be performed through a cooperative computation without revealing data inputs of the clients 120. Entity resolution/relationship detection may be embodied in multi-party computation such that all of the splits 112-1, 112-2, 112-3, and 112-4 are required to participate in computations. In some embodiments, program 110 may be embodied such that a majority of splits 112 may operate to perform entity resolution/relationship detection.

Entity resolution may be performed based on a plurality of rules to determine if two seemingly dissimilar records are in fact the same entity. Relationship detection may be performed by a plurality of rules to determine if two seemingly similar records are actually separate but related entities. Examples of such rules include the following: Two entities with the same last name and the same address or phone number and the same birth date are a single individual. Two entities with the same last name and the same address or phone number in which one's first name is an abbreviation of the other's are a single individual, unless they have different ages, in which case they are related. Two entities with the same last name and the same address or phone number and no other shared data are related. Two individuals with the same work phone number are related. The number of rules for entity resolution/relationship detection embedded within program 110 may be between twelve and forty such rules.

Figure 2:
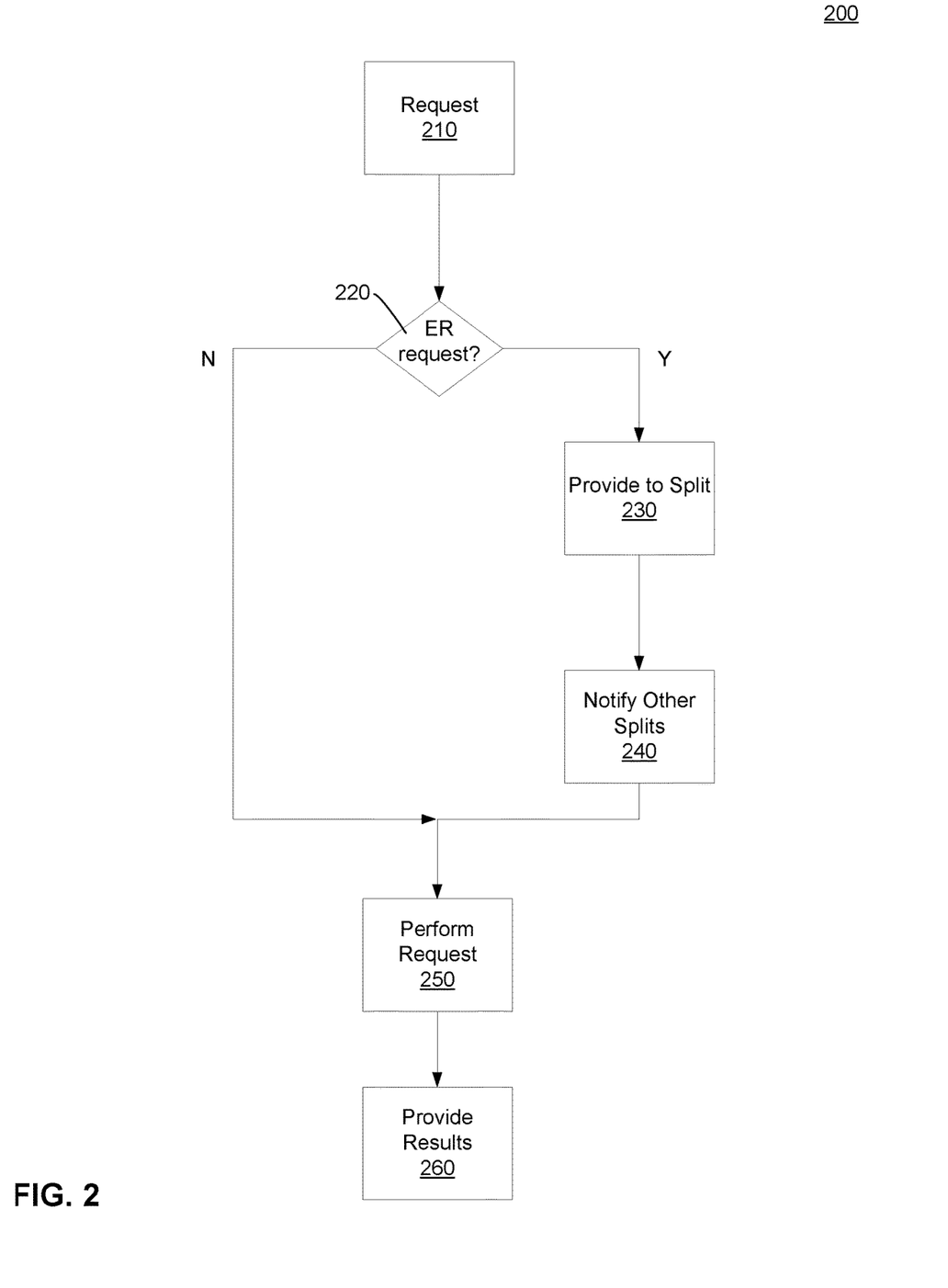
FIG. 2 depicts an example method for performing entity resolution operations in a secure data store, consistent with some embodiments of the disclosure.

FIG. 2 depicts an example method 200 for performing entity resolution operations in a secure data store, consistent with some embodiments of the disclosure. Method 200 may be executed by a computer system, such as a server, desktop computer, or portable computing device. FIG. 3 depicts a computer system 301 operable as a computer system consistent with some embodiments. Method 200 may be provided as a service including multiple computers, either alone or together. Method 200 may be hosted as a workflow from an on-demand network access to a shared pool of configurable computing resources. FIG. 5 depicts a series of functional abstraction layers provide by a cloud computing environment 50 capable of hosting method 200 consistent with some embodiments of the disclosure. Method 200 may be performed repeatedly or continuously, such as every 100 milliseconds or every 16.6 milliseconds. In some embodiments, more or less operations may be performed, or some operations may be combined or performed concurrently.

Referring back to FIG. 2, At 210 a request to perform an operation may be received. The operation may be received from a client device sending the request across a network. The operation may be received from a user login associated with a party, such as a research organization. The operation may be received by retrieving or polling a request queue or other operational stack of an operating system or hypervisor. The operation may be a record operation related to data uploaded by a party. The operation may include any of the following: a request to insert a new record, a request to update one or more attributes of an existing record, a request to view an existing record and one or more related attributes.

The operation, of the request at 210, may be an entity resolution operation. An entity resolution operation may be an operation to determine the similarity between two records. An entity resolution operation may be a relationship determination operation to determine if there is a relationship between two records.

At 220, it may determine if the request is an entity resolution operation. If so, control may flow to 230, where the entity resolution operation is provided to a split of an entity resolution/relationship determination program. The split may be a logical subsection or other portion of a secure multi-party computation. The split may only be able to perform operations in coordination with other splits of the secure multi-party computation. The split may be formed at compilation of the secure multi-party computation. Providing the split may include transmitting the request from a client or other component owned and controlled by a party to the split. Providing to a split may be based on the origin of the request. For example, if a request is received at 210 from a first party, then the request may be provided to a corresponding first split assigned to the first party. In another example, if a request is received at 210 from a fifth party, then the request may be provided to a corresponding fifth split assigned to the fifth party.

At 240, one or more other splits required for performing an entity resolution/relationship determination program may be notified. Notifying of other required splits may include transmitting the request, either in whole or in part, to the other splits. Notifying of other required splits may include sending a wake-up command or request to participate in execution operations notification. In some embodiments, notifying the required splits includes notifying all other splits of a program. In some embodiments, notifying the required splits includes notifying a subset of other splits of a program. For example, there may be three splits, party A split, party B split, and server split. To perform an entity resolution operation wherein party A may wish to determine if there is a relation between one of their records and a record of party B. Notifying of the required splits may include notifying the server split. This may be accompanied by providing a threshold shared key for authentication.

If a request is not an entity resolution operation at 220, control may flow to block 250, where the request is performed. The request may be performed by a split of the requesting party. In some embodiments, the request may be performed by a client or other operator outside of the secure multi-party computation. For example, clients may be able to insert, update, or delete records into a shared database using database software or other relevant technology. The clients may not, however, be able to see or access records uploaded from other parties. Further, the clients may not be able to execute or perform any entity resolution/relationship determination program without the concerted execution of multiple splits of a secure multi-party computation. At 260, the requesting party may be provided with the results of the operation, such as a successful update of a record.

After notifying the other required splits, at 240, the requested entity resolution operation is performed at 250. Performance, at 250, may only be possible by multiple program splits. For example, a first program split is unable to perform the entity resolution operation without a second program split. In another example, a first program split is unable to perform the entity resolution operation without a second program split and a third program split. Performing an entity resolution operation may include the process that resolves entities and detects relationships within a plurality of stored records. Each of the records may include one or more attributes and performance of entity resolution operation may include executing a series of concise rules against the entity received in the request. Performance of the entity resolution operation may also include execution of the rules against other records stored in a secure storage.

Performing an entity resolution operation may include processing of records in three phases: recognize, resolve, and relate. The recognition phase may include validating, optimizing, and enhancing the incoming records. During this recognize phase, the records may be cleansed and attributes may be standardized, as well as performance of data quality checks on records to protect the integrity of an entity database within a secure storage. During entity resolution, attributes within the records may identified as entities. After the attributes in the records have been cleansed, standardized or enhanced, sophisticated search algorithms may be used to compare the attributes in the incoming record against existing entities in the entity database to determine if they are the same entity. During entity resolution, additional processing may also complete the relationship detection process, which detects relationships between identities and entities and generates alerts for relationships of interest. In some embodiment, scoring may also occur. For example, during entity resolution, the it may be determined how closely attributes for an incoming record match the attributes of an existing entity. The results of this computational analysis are scores that may be used to resolve identities into entities and detect relationships between entities.

After performance of an entity resolution operation at 250, a result of the operation may be provided at 260. The result of performing an entity resolution operation may include that two entities are the same, that two entities are related, that two entities are unrelated, or that it is indeterminate based on the attributes whether there is a detected relationship or that an entity is resolved. The result may be provided to the party that requested the performance of the entity resolution operation. Providing the result may also include a record identifier (ID), corresponding to the record that the party has that matched the entity resolution operation. In some embodiments, providing the result may include providing an attribute of another party to the requesting party, such as the ID or a matching attribute of another party's data to the requesting party. In some embodiments, another party having a record that matches a request may also be notified as party of providing the result. For example, a first party may get a response of a successful entity resolution operation regarding a record in a data set of second party. The second party may be notified of the first party by way of a message indicating a second party or a client of the second party performed an entity resolution request that was successful. The message may also indicate the record in the second party's data set that was identified, an attribute that was identified, or a record id of the corresponding record in the first party's data set.

FIG. 3 depicts the representative major components of an example computer system 301 that may be used, in accordance with some embodiments of the present disclosure. It is appreciated that individual components may vary in complexity, number, type, and\or configuration. The particular examples disclosed are for example purposes only and are not necessarily the only such variations. The computer system 301 may comprise a processor 310, memory 320, an input/output interface (herein I/O or I/O interface) 330, and a main bus 340. The main bus 340 may provide communication pathways for the other components of the computer system 301. In some embodiments, the main bus 340 may connect to other components such as a specialized digital signal processor (not depicted).

The processor 310 of the computer system 301 may be comprised of one or more cores 312A, 312B, 312C, 312D (collectively 312). The processor 310 may additionally include one or more memory buffers or caches (not depicted) that provide temporary storage of instructions and data for the cores 312. The cores 312 may perform instructions on input provided from the caches or from the memory 320 and output the result to caches or the memory. The cores 312 may be comprised of one or more circuits configured to perform one or more methods consistent with embodiments of the present disclosure. In some embodiments, the computer system 301 may contain multiple processors 310. In some embodiments, the computer system 301 may be a single processor 310 with a singular core 312.

The memory 320 of the computer system 301 may include a memory controller 322. In some embodiments, the memory 320 may comprise a random-access semiconductor memory, storage device, or storage medium (either volatile or non-volatile) for storing data and programs. In some embodiments, the memory may be in the form of modules (e.g., dual in-line memory modules). The memory controller 322 may communicate with the processor 310, facilitating storage and retrieval of information in the memory 320. The memory controller 322 may communicate with the I/O interface 330, facilitating storage and retrieval of input or output in the memory 320.

The I/O interface 330 may comprise an I/O bus 350, a terminal interface 352, a storage interface 354, an I/O device interface 356, and a network interface 358. The I/O interface 330 may connect the main bus 340 to the I/O bus 350. The I/O interface 330 may direct instructions and data from the processor 310 and memory 320 to the various interfaces of the I/O bus 350. The I/O interface 330 may also direct instructions and data from the various interfaces of the I/O bus 350 to the processor 310 and memory 320. The various interfaces may include the terminal interface 352, the storage interface 354, the I/O device interface 356, and the network interface 358. In some embodiments, the various interfaces may include a subset of the aforementioned interfaces (e.g., an embedded computer system in an industrial application may not include the terminal interface 352 and the storage interface 354).

Logic modules throughout the computer system 301—including but not limited to the memory 320, the processor 310, and the I/O interface 330—may communicate failures and changes to one or more components to a hypervisor or operating system (not depicted). The hypervisor or the operating system may allocate the various resources available in the computer system 301 and track the location of data in memory 320 and of processes assigned to various cores 312. In embodiments that combine or rearrange elements, aspects and capabilities of the logic modules may be combined or redistributed. These variations would be apparent to one skilled in the art.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
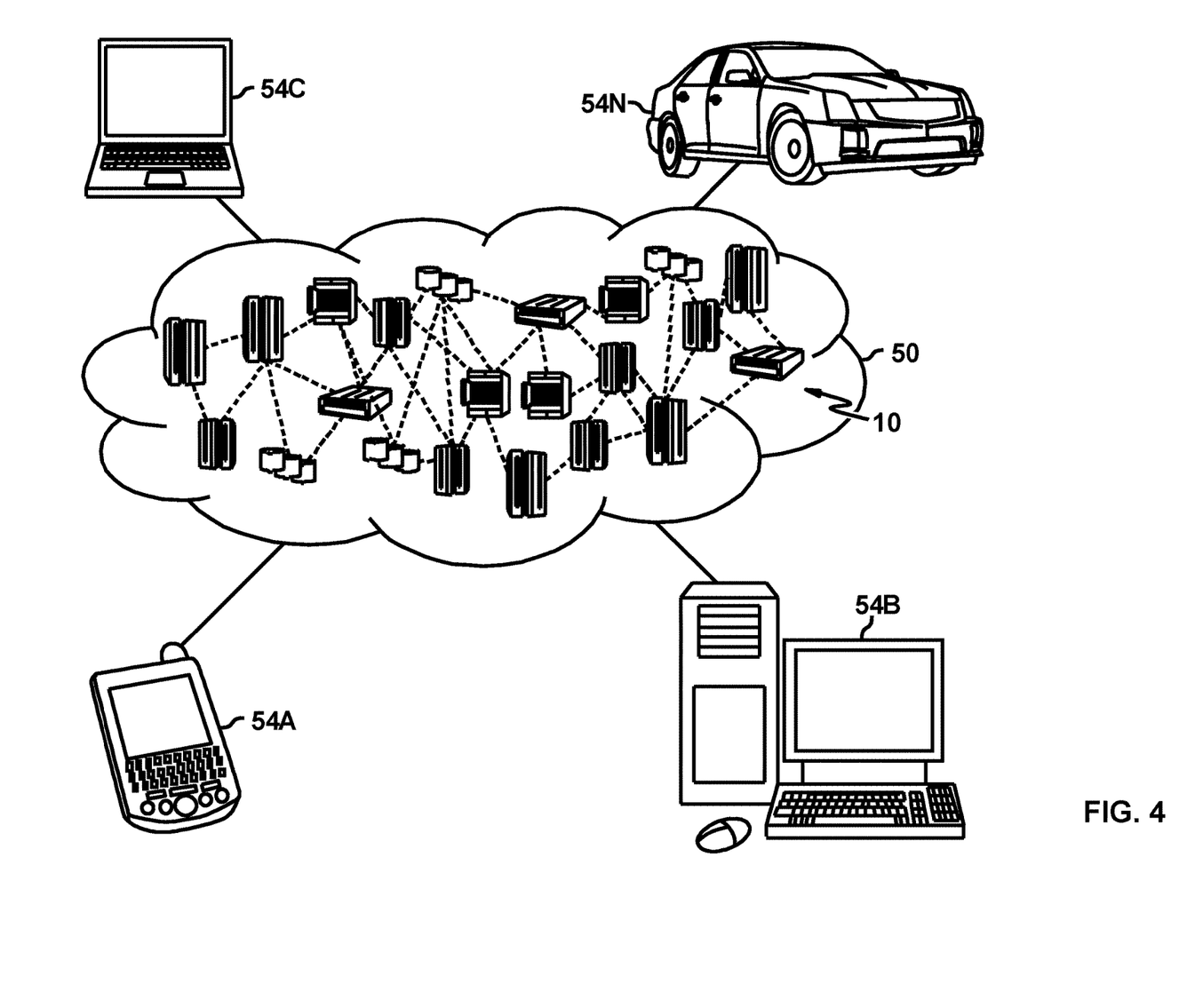
FIG. 4 depicts a cloud computing environment according to an embodiment of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and secure multi party entity resolution (SMPER) 96. For example, a request to perform an entity resolution may be received by one or more clients from portal 83. The request may be passed to a first split (not depicted) of SMPER 96. SMPER 96 may, responsively determine, without revealing any of the entity records unowned by the requester the result of the entity resolution request back to management layer 80.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:
   receiving, from a first client, a first request to perform an entity resolution operation, wherein the first request is related to a first record uploaded by the first client, wherein the first record has one or more first attributes, and wherein the first record is stored in a secure data store;
   transmitting the first request to a first program split of a secure multi-party computation; and
   performing, by the first program split of the secure multi-party computation and by a second program split of the secure multi-party computation and by a third program split of the secure multi-party computation and based on the first request received from the first client, an entity resolution operation related to the first record and one or more second records uploaded to the secure data store by a second client,
   wherein the second program split is only accessible by the second client, wherein the first client is unable to access the one or more second records uploaded to the secure data store by the second client,
   wherein the third program split of the secure multi-party computation operates in the secure data store, and
   wherein the first program split alone does not have access to the first record in the secure data store.

2. The method of claim 1, wherein the first program split is only accessible by the first client.

3. The method of claim 1, wherein the first program split is unable to perform the entity resolution operation without the third program split,
   and wherein the third program split is not accessible by the first client.

4. The method of claim 1,
   wherein the first program split is unable to perform the entity resolution operation without the second program split.

5. The method of claim 4, wherein the first client cannot discern any meaning regarding the secure data store,
   and wherein the second client cannot discern any meaning regarding the secure data store.

6. The method of claim 1, wherein software is provided as a service in a cloud environment,
   and wherein at least one split of the secure multi-party computation is located on a cloud computer system of a cloud computing service provider,
   and wherein the secure data store is located on the cloud computer system.

7. The method of claim 1, wherein the entity resolution operation is a relationship detection based on a predetermined set of rules.

8. The method of claim 1 further comprising:
   transmitting, by the first client and before the receiving the first request, the first record to the secure multi-party computation; and
   inserting, by the first program split of the secure multi-party computation, the first record into the secure data store,
   wherein the second client is unable to access any first records in the secure data store transmitted from the first client.

9. The method of claim 1, wherein the method further comprises:
   transmitting, by the second client and before the receiving the first request, a second record to the secure multi-party computation, the second record having one or more second attributes; and
   inserting, by the second program split of the secure multi-party computation, the second record into the secure data store,
   wherein the first client is unable to access any second records in the secure data store transmitted from the second client, and
   wherein the second client is unable to access any first records in the secure data store transmitted from the first client.

10. The method of claim 9, wherein performing the entity resolution operation comprises:
    determining a result of performing the entity resolution operation between the first record and the second record; and
    notifying the first client of the result.

11. The method of claim 10, wherein the first record includes a first identifier attribute of the one or more first attributes, and wherein the second record includes a second identifier attribute of the one or more second attributes, wherein the method further comprises:

sending the second identifier attribute to the second client.

12. The method of claim 11, wherein the method further comprises:

notifying the second client of the first client.

13. The method of claim 12, wherein the method further comprises:

sending the first identifier attribute to the second client.

14. A system comprising:

a memory; and a processor, the processor communicatively coupled to the memory, the processor configured to:

receive, from a first client, a first request to perform an entity resolution operation, wherein the first request is related to a first record uploaded by the first client, wherein the first record has one or more first attributes, and wherein the first record is stored in a secure data store;

transmit the first request to a first program split of a secure multi-party computation; and perform, by the first program split of the secure multi-party computation and by a second program split of the secure multi-party computation and by a third program split of the secure multi-party computation and based on the first request received from the first client, an entity resolution operation related to the first record and one or more second records uploaded to the secure data store by a second client, wherein the second program split is only accessible by the second client, wherein the first client is unable to access the one or more second records uploaded to the secure data store by the second client, and wherein the third program split of the secure multi-party computation operates in the secure data store.

15. The system of claim 14, wherein the processor is further configured to:

transmit, by the second client and before the receiving the first request, a second record to the secure multi-party computation, the second record having one or more second attributes; and insert, by the second program split of the secure multi-party computation, the second record into the secure data store, wherein the first client is unable to access any second records in the secure data store transmitted from the second client, and wherein the second client is unable to access any first records in the secure data store transmitted from the first client.

16. The system of claim 15, wherein performing the entity resolution operation comprises:

determining a result of performing the entity resolution operation between the first record and the second record; and notifying the first client of the result.

17. A computer program product, the computer program product comprising a computer readable storage medium having program instructions embodied therewith, the program instructions configured to:

receive, from a first client, a first request to perform an entity resolution operation, wherein the first request is related to a first record uploaded by the first client, wherein the first record has one or more first attributes, and wherein the first record is stored in a secure data store;

transmit the first request to a first program split of a secure multi-party computation; and perform, by the first program split of the secure multi-party computation and by a second program split of the secure multi-party computation and by a third program split of the secure multi-party computation and based on the first request received from the first client, an entity resolution operation related to the first record and one or more second records uploaded to the secure data store by a second client, wherein the second program split is only accessible by the second client, wherein the first client is unable to access the one or more second records uploaded to the secure data store by the second client, wherein the secure data store includes oblivious random-access memory, and wherein the third program split of the secure multi-party computation operates in the secure data store.

18. The computer program product of claim 17, wherein the first program split is unable to perform the entity resolution operation without the third program split, and wherein the third program split is not accessible by the first client.

19. The computer program product of claim 17 wherein the first program split is unable to perform the entity resolution operation without the second program split.

* * * * *